United States Patent [19]

Reeber

[11] 3,800,071

[45] Mar. 26, 1974

[54] GRAPHIC ARTS PROCESS SIMULTATION SYSTEM

[75] Inventor: Nicholas J. Reeber, Hauppauge, N.Y.

[73] Assignee: Hazeltine Corporation, Greenlawn, N.Y.

[22] Filed: Apr. 10, 1972

[21] Appl. No.: 242,867

Related U.S. Application Data

[63] Continuation of Ser. No. 874,550, Nov. 6, 1969, abandoned.

[52] U.S. Cl. .............................. 178/5.2 A, 178/6.7

[51] Int. Cl. .......................... H04n 5/84, H04n 9/32

[58] Field of Search ........... 178/5.2 A, 6.7 A, 5.2 R

[56] References Cited

UNITED STATES PATENTS

| | | | |
|---|---|---|---|
| 3,123,666 | 3/1964 | Railey | 178/5.2 A |
| 3,128,333 | 4/1964 | Loughlin | 178/5.2 A |
| 3,131,252 | 4/1964 | Farber et al. | 178/5.2 A |
| 3,529,078 | 9/1970 | Murata | 178/5.2 A |

FOREIGN PATENTS OR APPLICATIONS

| | | | |
|---|---|---|---|
| 906,546 | 9/1962 | Great Britain | 178/5.2 A |

*Primary Examiner*—Howard W. Britton

[57] ABSTRACT

Disclosed is a system which electro-optically scans a set of color separations and processes the resulting signals in accordance with an electrical analog of an adjustable, halftone color reproduction process to develop a group of output signals which collectively represent the apparent color, in a given color representation system, of elemental areas of the actual composite color print that could be obtained from the set of color separations by means of the half-tone color reproduction process. The group of output signals is developed in such a form as to be readily utilizable in diverse forms of color image display apparatus for developing a displayed color image which simulates the aforementioned actual composite color print.

Also disclosed is novel electro-optical apparatus useful in the above system for scanning simultaneously, in parallel, the four photographic transparencies of a four-color separation set. The electro-optical apparatus utilizes a bank of four lenses to simultaneously image the raster of a scanning light source onto each of four corresponding color separation transparencies which are positioned in a rectangular array in a common plane. The scanning light transmitted by each transparency is independently collected and detected to generate a set of output signals, each of which is representative of the transmissivity of successively scanned elemental areas of a corresponding one of the separation transparencies. The relative positions of the scanning light source, the bank of lenses and the set of color separations are readily adjustable, thereby permitting the apparatus to scan color separation transparency sets of different dimensions.

8 Claims, 10 Drawing Figures

GRAPHIC ARTS PROCESS SIMULATION SYSTEM

This is a continuation of application Ser. No. 874,550, filed Nov. 6, 1969, now abandoned.

INTRODUCTION

The present invention relates to a system which electronically simulates an adjustable graphic arts color reproduction process, wherein a set of color separation transparencies, representative of an original color image, is used to control the depositing of a corresponding set of colored inks onto a base material, such as paper, in order to create a composite color print of the original color image. More particularly, the present invention relates to an improved form of such system which is useful in deriving an electronically displayed preview color image that simulates the aforementioned composite color print.

In the graphic arts field, the common practice of test printing, or "proofing", each new set of color separations to determine the effects which a particular graphic arts reproduction process will have thereon is expensive, time consuming and grossly inefficient, and, if eliminated, would result in significant cost savings for the industry. Although the need for and utility of apparatus which is capable of electronically simulating a graphic arts reproduction process in order to virtually instantaneously proof a set of color separations has been recognized in the prior art, as is shown by U.S. Pat. No. 3,131,252, issued Apr. 28, 1964, to Farber et al., yet, practical equipment has not been commercially available.

While the Farber et al patent describes apparatus intended to develop an electronically displayed color proof image from a set of color separations, nevertheless, the described manner of operation does not represent a direct electrical analog of a graphic arts color reproduction process. Furthermore, the described apparatus does not permit easy adjustment of circuit characteristics so as to allow accurate simulation of a number of different graphic arts processes and different choices of the variables in any single such process.

It is therefore an object of the present invention to provide a new and improved electronic color proofing system which is capable of accurately simulating different graphic arts color reproduction processes, which is easily adjustable for simulating the variables in such a process, and which is readily adaptable for displaying the resultant color proof image by means of different types of color image display apparatus.

It is another object of the present invention to provide new and improved electro-optical apparatus useful in such color proofing systems for scanning a set of color separation transparencies in a particularly simple manner that permits different size transparency sets to be scanned by means of readily made adjustments in the electro-optical apparatus.

In accordance with the present invention an electronic color proofing system for deriving from a set of color separations, a group of electrical signals collectively representative of the apparent color of elemental areas of a composite color reproduction which can be obtained from the set of separations by depositing color pigments on a base material by means of an adjustable, half-tone color reproduction process comprises electro-optical means, which accepts and positions the set of separations in a nonoverlapping orientation in a common plane, for simultaneously scanning the separations of the set with light from a scanning light source for developing a corresponding set of image signals, each signal representing the image characteristics of successively scanned elemental areas of a corresponding one of the separations. The system further includes first analog signal processing means for processing each image signal of the set in accordance with an electrical analog of the reproduction process for developing a corresponding set of area signals, each representing the fractional portion of each corresponding elemental area of the composite color reproduction that will be occupied by a predetermined color pigment deposited therein by means of the reproduction process. The system additionally includes second analog signal processing means for processing the set of area representative signals in accordance with mathematical relationships which define the apparent color of each corresponding elemental area of the composite color reproduction caused by the deposition of the color pigments therein by means of the color reproduction process for developing a group of output signals which collectively represent in a given color representation system the apparent color of each of the elemental areas and which may be readily utilized by different types of color display apparatus for displaying a color image simulating the composite color reproduction which can be obtained from the set of separations by means of the adjustable, half-tone color reproduction process.

Also in accordance with the present invention electro-optical apparatus for simultaneously scanning a set of transparencies with light for developing a corresponding set of image signals, each representing the amount of scanning light transmitted through successively scanned elemental areas of a corresponding one of the transparencies, comprises scanning light source means for repetitively scanning a predetermined raster with a spot of light and means for accepting and positioning the transparencies of the set in a nonoverlapping orientation in a common plane. The apparatus further includes a set of lenses, located in a plane between the scanning light source means and the set of positioned transparencies, each lens for imaging the raster onto a corresponding one of the transparencies, thereby simultaneously scanning the transparencies with light from the source, and each lens having an optical axis which intersects a boundary point on the raster and a corresponding boundary point on the transparency associated with that lens. The apparatus finally includes a set of light collection and detection means, each for collecting and detecting the scanning light transmitted by a corresponding one of the positioned transparencies for developing a set of image signals, each representative of the amount of scanning light transmitted through successively scanned elemental areas of a corresponding one of the transparencies.

For a better understanding of the present invention, together with other and further objects thereof, reference is had to the following description taken in connection with the accompanying drawings and its scope will be pointed out in the appended claims.

GENERAL SYSTEM DESCRIPTION

Figure 1:
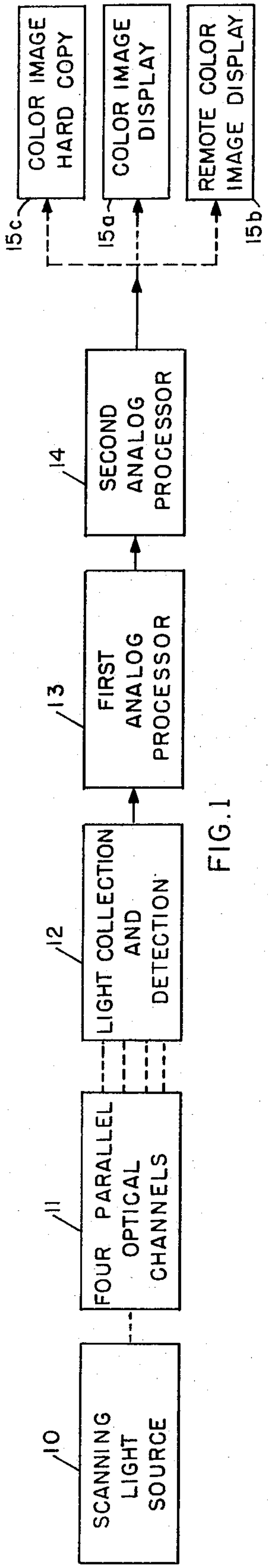
FIG. 1 is a block diagram of apparatus embodying the present invention in one form.

There is shown in FIG. 1 of the drawings a block diagram of an electronic graphic arts, color proofing system which embodies the present invention in one form. The units of FIG. 1 will be collectively described as a system first, with individual units being described in greater detail hereinafter.

Included in the system of FIG. 1 is the combination of a scanning light source unit 10, a unit 11, which has four parallel optical channels and accepts a set of four color-separation transparencies, and finally a light collection and detection unit 12, which three units collectively comprise electro-optical means for simultaneously scanning a set of color separations with light from a common scanning light source for developing a corresponding set of image signals, each representing the instantaneous amount of scanning light transmitted through successively scanned elemental areas of a corresponding one of the separations.

In four-color graphic arts processes, which the embodiment of FIG. 1 is primarily intended to simulate, a set of four color separation transparencies representative of cyan, magenta, yellow and black is prepared from an original color image and it is this set which functions as the input to the present system. These transparencies may contain either continuous-tone or half-tone images and may be either positives or negatives. Thus, each image signal of the set developed by unit 12 is representative of the amount of scanning light transmitted by successively scanned elemental areas of a corresponding one of these four color separation transparencies. For convenience these signals have been designated $T_c$, $T_m$, $T_y$ and $T_k$, representative respectively of the image characteristics of the cyan, magenta, yellow and black color separations.

The image signals developed by the light collection and detection unit 12 are supplied to a first analog processor 13, which comprises first analog signal processing means for independently processing each image signal of the supplied set in accordance with an electrical analog of the adjustable, graphic arts, color reproduction process being simulated, for developing a corresponding set of area signals, each area signal representing the fractional portion of each corresponding elemental area of the composite color print that is occupied by a predetermined color pigment, or ink, deposited therein during the color reproduction process.

The resulting set of area representative signals from processor 13 are supplied to the input of a second analog processor 14 which comprises second analog signal processing means for processing the set of area representative signals in accordance with mathematical relationships which define the apparent color of each corresponding elemental area of the composite color print caused by the colored inks having been deposited therein. The second analog processing means develops a group of output signals which collectively represent, in a given color representation system, the apparent color of each of the corresponding elemental areas of the composite color print. These output signals are of such a form as to be readily utilized by different types of color image display apparatus for displaying a color image simulating the composite color print that can be obtained from the original set of color separations by means of the particular adjustable, graphic arts color reproduction process being simulated.

Figure 5:
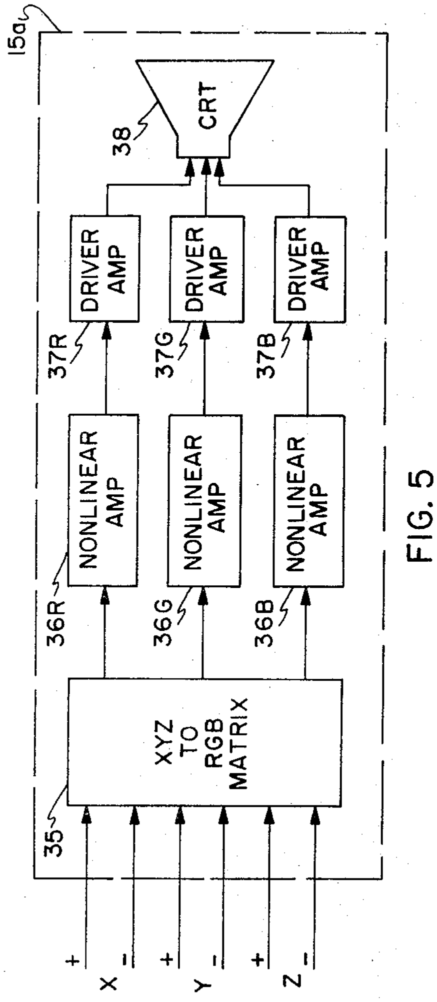
FIG. 5 is a block diagram of color image display apparatus useful with the apparatus of FIG. 1.

Examples of different types of color display apparatus which may be useful in conjunction with the present graphic arts process simulation system are the units 15*a*, 15*b* and 15*c* shown in FIG. 1. Unit 15*a* represents color image display apparatus which instantaneously displays, on the face of a color cathode-ray tube, for example, the simulated composite color print represented by the signals available at the output of second analog processor 14. A suitable color TV type display unit which can be used as unit 15*a*, is shown in FIG. 5 of the drawings.

Unit 15*b* represents another form of color image display apparatus by means of which the color image information contained in the output signals supplied by the second analog processor 14 can be transmitted to a remote location and can there be utilized to display the simulated composite color print represented by the output signals of processor 14, in the same manner as unit 15*a*. This arrangement is useful in that the simulated color print can be evaluated by such persons as art directors or advertising agency personnel who are usually located in offices remote from the printing plant site where the process simulation system of the invention would normally be installed.

Finally unit 15*c* represents yet another form of color image display apparatus which can rapidly produce a hard copy, by means of fast developing color photographic tenchiques, for example, of the simulated composite color print represented by the output signals of second analog processor 14.

DESCRIPTION OF ELECTRO-OPTICAL APPARATUS

Figure 9:
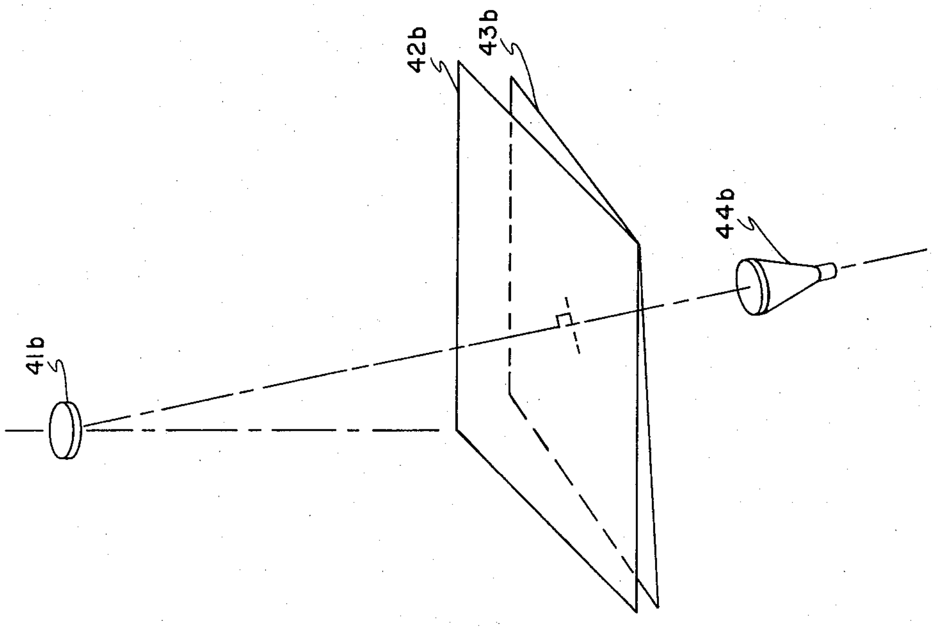
FIG. 9 illustrates in further detail one feature of the electro-optical system of FIG. 8.

In a system constructed in accordance with the present invention a set of color separation transparencies is scanned by means of electro-optical apparatus to develop a set of image signals, each of which is representative of the transmissivity of successively scanned elemental areas of a corresponding one of the transparencies. In the block diagrams of FIGS. 1 and 2, this apparatus is shown generally as consisting of the units 10, 11 and 12. A particularly unique configuration for such electro-optical apparatus which is capable of accepting color separation sets consisting of four transparencies, and sets which may be of different size will now be described and is shown in FIGS. 8, 9 and 10 of the drawings.

Figure 8:
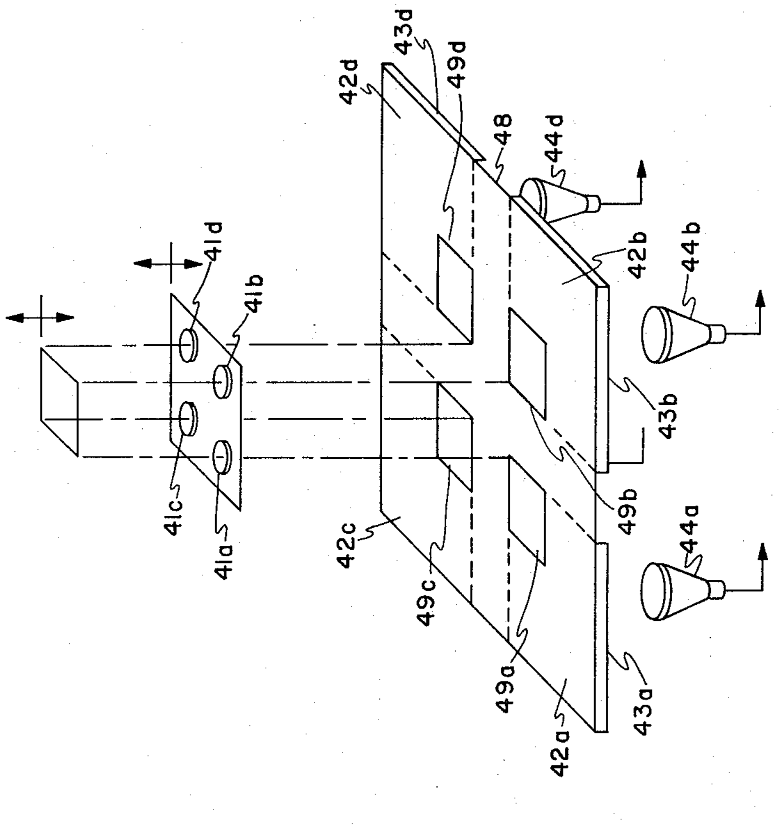
FIG. 8 is a perspective view of an electro-optical system constructed in accordance with one embodiment of the present invention.
Figure 10:
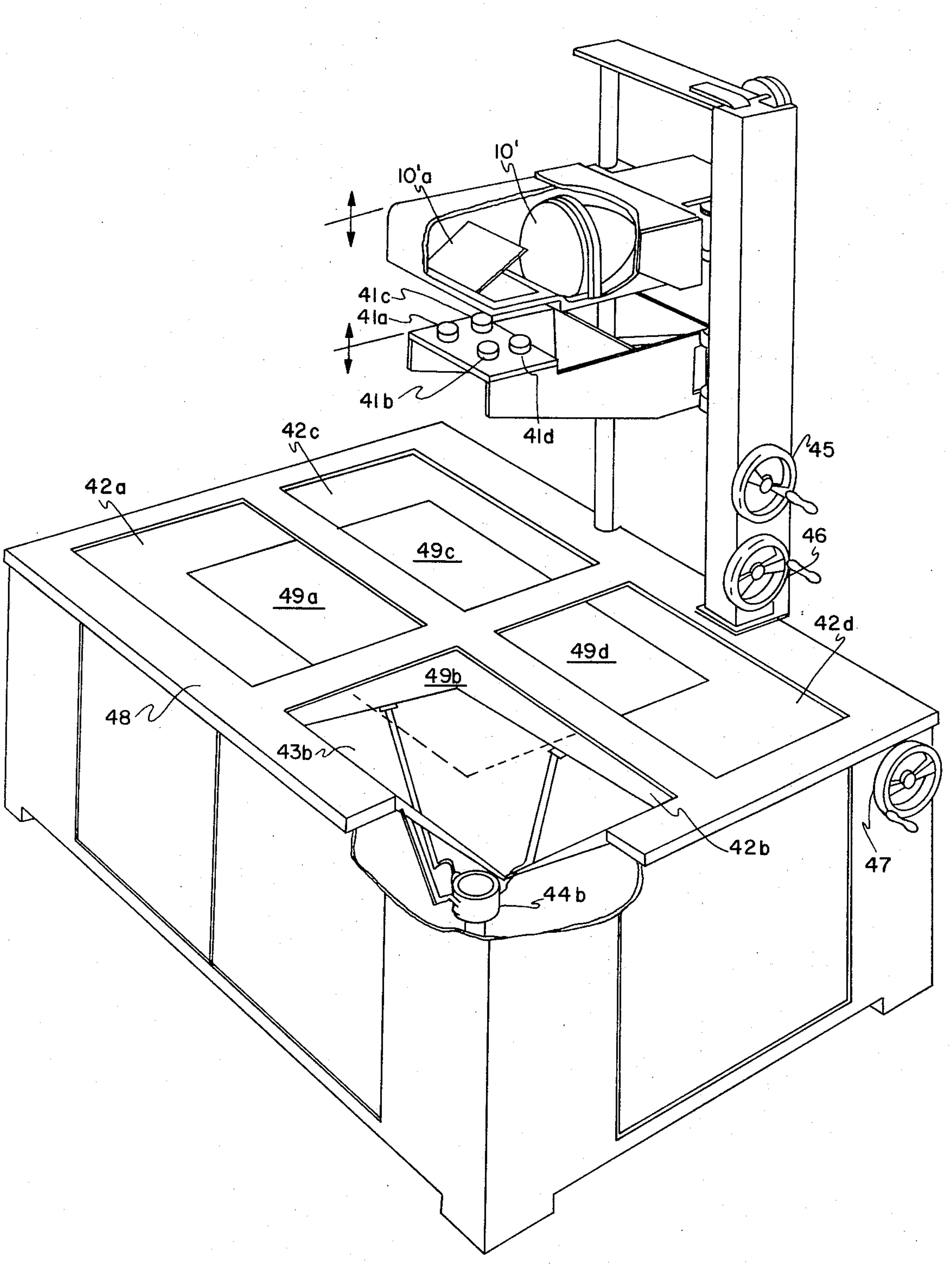
FIG. 10 is a perspective view of actual equipment embodying the electro-optical system of FIG. 8.

The electro-optical apparatus shown in perspective view in FIGS. 8 and 10 includes the combination of a flying spot scanner 10' and an associated mirror 10'*a* which comprises scanning light source means for repetitively scanning a predetermined raster with a spot of light. The flying spot scanner may be of conventional design, having a short persistence phosphor which, when activated by a beam of electrons, creates a small spot of light (typically four mils in diameter) on the face of the scanner. Associated conventional deflection circuitry, which is not shown, scans the spot to create a predetermined rectangular TV type raster consisting of parallel lines. Mirror 10'*a* is provided merely to permit the scanner to be mounted in a horizontal position instead of vertically. Additional circuitry may be included to provide dynamic focusing of the electron beam of the flying spot scanner in order to improve the uniformity of the light generation characteristic of the flying spot scanner over the entire raster area. Also, circuitry which responds to the light output of the flying spot scanner and which includes a feedback loop for modulating the intensity of the scanner's electron beam can also be included to further improve light uniformity over the entire raster area.

Also included in the electro-optical apparatus of FIG. 8 is means for accepting and positioning a set of four separation transparencies in a nonoverlapping orientation and substantially in a common plane. In the FIG. 8 apparatus this means comprises the surface of table 48 having four identical apertures arranged in a rectangular array. Each aperture contains a transparent glass plate large enough to accommodate the largest size set of separation transparencies that it is desired to proof. Each of the transparencies 49*a*, 49*b*, 49*c*, 49*d* of the set to be scanned is placed on a corresponding one of the glass plates 42*a*, 42*b*, 42*c* and 42*d* in such a manner that a corner of each transparency occupies the central corner of its associated aperture as shown in FIGS. 8 and 10. This orientation of the transparency set can be maintained by any suitable mechanical indexing scheme, such as a set of small index pins in the top of table 48 and a corresponding set of index holes in the edges of the color separation transparencies. As will be explained in detail hereinafter, this orientation of the transparency set enables the apparatus to conveniently accommodate transparency sets of different size. Thus, the apparatus is capable of scanning transparency sets which are five, ten, or twenty inches long for example with equal ease, so long as the transparencies of each set are oriented such that one corner of each transparency occupies the central corner of its corresponding glass plate in an aperture of the table 48, as shown in FIGS. 8 and 10.

Electro-optical apparatus constructed in accordance with the present invention also includes a set of lenses 41*a*, 41*b*, 41*c* and 41*d* shown in FIG. 8, located in a plane between the scanning light source means and the set of positioned transparencies and parallel to the plane of the latter. Each lens images the raster scanned by the flying spot scanner 10' onto a corresponding one of the positioned transparencies, thereby simultaneously scanning all of the transparencies. In accordance with one aspect of the invention, each of the lenses has an optical axis which intersects a given boundary of the raster scanned by the flying spot scanner 10' and a corresponding boundary of the transparency associated with that lens. More particularly, as shown in FIG. 8, the optical axis of each lens intersects a corner of the raster and the central corner of its associated transparency on table 48. Since the central corners of the apertures in table 48 are utilized as the referenced points for orienting each of the color separation transparencies of a set within the apertures, each of the four optical azes will always intersect the central corner of a corresponding one of a set of four separation transparencies when the set is properly oriented within the apertures of the table 48. This unique relationship between the corners of the raster scanned by the flying spot scanner, the optical axes of the lens set 41–41*d* and the central corners of the transparency set placed within the apertures of the table top 48, permits the apparatus of FIGS. 8 and 10 to accommodate transparency sets of different size, since the location of these central corners is the same for every set of transparencies regardless of their size. As different size transparency sets are utilized, they merely occupy a greater or lesser area within the aperture in a radial direction from the central corners which are used as reference orientation points.

For clarity in explaining the above relationship between the raster scanned by flying spot scanner 10', the axes of lenses 41*a* – 41*d* and the set of transparencies 49*a* – 49*d*, it was assumed that the axes of lenses 41*a* – 41*d* intersected the actual corners of the raster and the actual corners of the transparencies. In practice, however, the raster is generated slightly oversize so that the axes of lenses 41*a* – 41*d* intersect the four corners of an effective raster area which lies within the oversize raster. Also, in practice each of the transparencies 49*a* – 49*d* will normally contain an opaque border surrounding the actual image area. Therefore it is the central corner of each image area of a transparency that is intersected by one of the axes of the lenses 41*a* – 41*d*.

The electro-optical apparatus of FIG. 8 finally includes a set of light collection and detection means, each for collecting and detecting the scanning light transmitted by a corresponding one of the positioned transparencies for developing a set of image signals, $T_c$, $T_m$, $T_y$, $T_k$, each image signal being representative of the amount of scanning light transmitted through successively scanned elemental areas of a corresponding one of the transparencies. In the embodiment of FIGS. 8 and 10, each of the light collection and detection means consists of a large Fresnel lens and an associated photomultiplier. For example, in FIG. 10 the Fresnel lens 43*b* and its associated photomultiplier 44*b* are shown through the cutout section of the equipment. These components are also shown in greater detail in FIG. 9.

The location of the flying spot scanner assembly and that of the set of lenses 41*a* – 41*d* are independently adjustable in a vertical direction along a common axis which passes through the center of the raster and the center of the bank of lenses 41*a* – 41*d*, via the control handles 45 and 46, respectively, of FIG. 10, in order to accommodate separation transparency sets of different size. It is therefore desirable to provide a corresponding change in the orientation of the Fresnel lens and photomultiplier for each channel, so that the plane of each Fresnel lens remains orthogonal to an imaginary line drawn through the center of its corresponding imaging lens and the center of the Fresnel lens. This imaginary line should also pass through the center of the associated photomultiplier as shown in FIG. 9. As can be seen in the diagram of FIG. 9, which illustrates this feature, as the imaging lens 41*b* moves in a vertical direction along its axis, the Fresnel lens 43*b* is rotated about its outside corner (diagonally opposite its central corner) in order to maintain orthogonality between the imaginary line which passes through the center of the lens 41*b* and the plane of lens 43*b*. Movement of the Fresnel lens may be accomplished by any suitable mechanical arrangement controlled preferably from outside the apparatus of FIG. 10 by control handle 47, for example. Since movement of the Fresnel lenses should be coordinated with vertical movement of the imaging lenses 41*a* – 41*d*, appropriate index marks can be provided on the control wheels 46 and 47 so that movement of the Fresnel lenses can be matched to movement of the imaging lenses. Alternatively, the control wheels can be mechanically synchronized.

A simpler light collection and detection scheme, which can be used in place of the Fresnel lens-single photomultiplier combination shown in FIGS. 8 and 10, is disclosed in copending U.S. Pat. No. 3,617,752 assigned to the same assignee as is the present case. Furthermore, if it is desired to reduce the effects of nonuniformities in the electro-optics of each channel to a minimum, the compensation apparatus disclosed in copending application Ser. No. 874,547, filed Nov. 6, 1969, now abandoned and assigned to the same assignee as is the present case, can be used in conjunction with either light collection and detection arrangement.

FIRST ANALOG PROCESSOR 13

Figure 2:
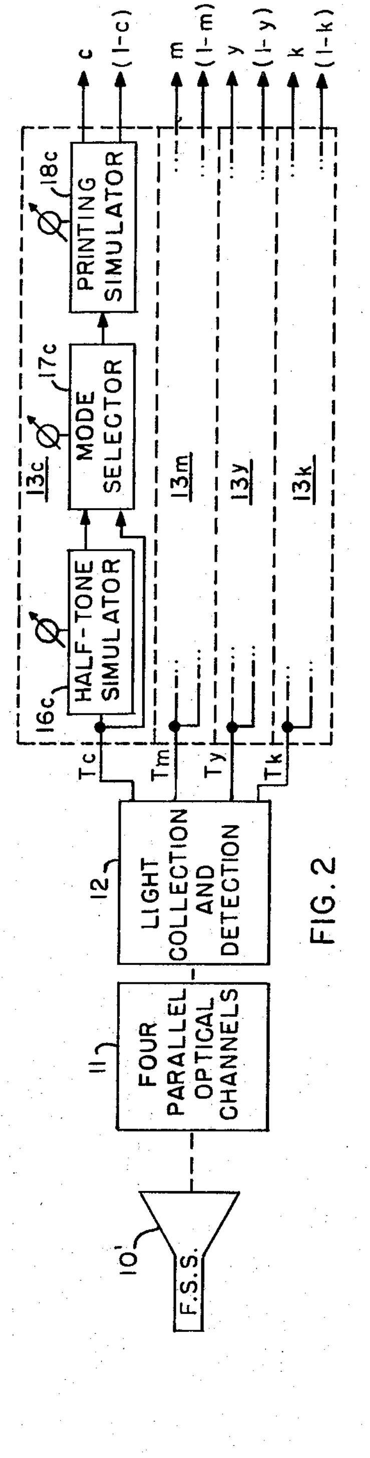
FIG. 2 is a block diagram showing a portion of the apparatus of FIG. 1 in greater detail.

The resulting image signals $T_c$, $T_m$, $T_y$ and $T_k$ developed at the output of the light collection and detection unit 12 in FIG. 2 are coupled to corresponding inputs of the first analog processor 13, which may consist of four parallel substantially identical signal processing channels 13*c*, 13*m*, 13*y* and 13*k*. Considering the cyan channel 13*c* of processor 13 as typical, this channel includes a half-tone simulator 16*c*, a mode selector 17*c* and a printing simulator 18*c* coupled in cascade in that order as shown in FIG. 2. Each of these units is shown in greater detail in FIG. 3, but briefly they function in accordance with an electrical analog of the particular graphic arts process being simulated to process the image signal $T_c$ from unit 12 in order to develop an output signal (c) which represents the fractional portion of each corresponding elemental area of the composite color print (i.e.; the fractional dot area) occupied by cyan ink deposited therein during the graphic arts color printing process being simulated.

Figure 3:
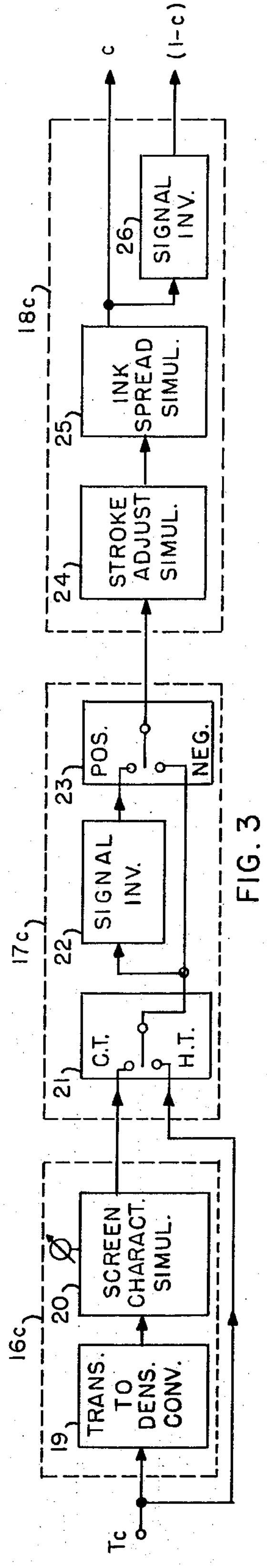
FIG. 3 is a block diagram showing a portion of a particular embodiment of the first analog processor shown in FIGS. 1 and 2.

If the set of transparencies being proofed contain continuous-tone images, the resulting image signal $T_c$ is converted by half-tone simulator 16*c* to a corresponding signal representative of dot area on the corresponding half-tone transparency or printing plate which can be produced from the continuous-tone cyan color separation transparency by means of a selected screening process. The manner in which this half-tone simulation can be performed is shown in FIG. 3. The image signal $T_c$, representative of the transmissivity of successively scanned elemental areas of a continuous-tone cyan color separation transparency, is applied to the input of transmissivity-to-density converter 19 which may be a logarithmic amplifier, for example. The resulting signal, which is representative of the density of successively scanned elemental areas of the continuous-tone cyan transparency, is then coupled to an adjustable screening characteristic simulator 20. Simulator 20 has an adjustable nonlinear signal translation characteristic which can be altered to simulate any one of a number of different screening processes and to simulate adjustment of the parameters, such as main, flash and bump exposures, etc., which may be varied in any given screening process. Screening characteristic simulator 20 may be any suitably adjustable nonlinear amplifier, or screening process simulation apparatus of the type disclosed and claimed in copending U.S. Pat. No. 3,629,493, and assigned to the same assignee as is the present case. The resulting signal developed at the output of the adjustable half-tone simulator 16*c* then is representative of and equivalent to the signal which would have been developed at the cyan output of unit 12 had a half-tone cyan color separation transparency been scanned instead of a continuous-tone cyan transparency. This output signal from half-tone simulator 16*c* is coupled to the continuous-tone (C.T.) input of mode selector 17*c* as shown in FIG. 3.

Mode selector 17*c* may consist of a pair of switches 21 and 23, and a signal inverter 22 arranged as shown in FIG. 3. While signal inverter 22 may be an inverting amplifier, it is preferable to use the gated inverter disclosed in copending U.S. Pat. No. 3,644,668, and assigned to the same assignee as is the present case. Switch 21 is set in its continuous-tone, or CT, position whenever transparencies of this type are being proofed, thereby coupling the half-tone representative signal from simulator 16*c* through to the remainder of the channel. When half-tone transparencies are being proofed, switch 21 is placed in its half tone, or H.T., position, thereby coupling the half-tone representative signal from unit 12 directly through to the remainder of the channel and bypassing the half-tone simulator 16*c* which is not used in this instance.

Regardless of whether the transparency set being proofed is a continuous-tone set or a half-tone set, the set may contain either negative or positive images. Thus, mode selector 17*c* performs a second function via its switch 23. Switch 23 is set in the positive, or POS, position whenever transparencies of this type are being proofed. For example, if the signal from switch 21 is representative of a half-tone, positive, cyan separation transparency, it is inverted in signal inverter 22, to produce a signal representative of the corresponding half-tone, negative, cyan separation transparency, which signal in turn, is coupled by switch 23, set in its POS position, through to the remainder of the channel. When negative transparencies are being proofed, switch 23 is placed in the negative, or NEG, position thereby coupling the half-tone negative representative signal from switch 21 directly through to the remainder of the channel, and bypassing the signal inverter 22 which is not used in this instance.

Thus, although the present system is capable of accepting color separation transparency sets which are either continuous-tone or half-tone, and which are either positives or negatives, the operation of each half-tone simulator 16 and each mode selector 17 are such that a standard type signal is always fed to the input of each printing simulator 18, namely a signal which is representative of successively scanned elemental areas of a half-tone, negative color separation transparency. This simplifies the design of the printing simulators 18 and results in a system which contains units that are the direct electrical analogs of corresponding individual portions of the graphic arts color reproduction process being simulated. This offers a significant advantage in that the system can simulate the effects caused by varying any one or more of the adjustable parameters of any portion of an actual graphic arts process, since each portion is represented by a separate signal processing element or unit in the system and the characteristics of each such element or unit can be adjusted independently of the other elements or units.

Finally included in the cyan channel 13c of first processor 13 is an adjustable printing simulator 18c which may take the form shown in FIG. 3, consisting of a stroke adjustment simulator 24, an ink spreading simulator 25, and a signal inverter 26 arranged as shown. Printing simulator 18c accepts the signal developed at the output of mode selector 17c, which signal in effect is representative of the ink areas of a corresponding half-tone cyan printing plate, and translates this signal through units 24 and 25 to simulate the effect of using such a printing plate on a printing press to print a corresponding half-tone cyan ink image on paper. Unit 24 simulates adjustment of printing press stroke, which adjustment produces a substantially linear change in ink dot size in the printed half-tone cyan ink image. For example, stroke adjustment simulator 24 can be a simple potentiometer connected between the output of unit 17c and ground, with its adjustable tap serving as the output of unit 24.

Unit 25 simulates the dot spreading effect which occurs when a given size ink dot is deposited on paper. This dot spreading is attributable to capillary action in the paper due to its porosity, and can usually be simulated by nonlinearly amplifying the signal from unit 24. Thus, unit 25 may be any suitable amplifier whose translation characteristic is nonlinear and preferably also adjustably nonlinear, so as to be capable of simulating the dot spreading characteristic of a number of different ink-paper combinations. The specific shape of this characteristic can be determined empirically for each specific ink-paper combination that it is desired to simulate.

The resulting output signal (c) from the dot spreading simulator 25 is the primary output signal of unit 18c and is representative of the portion (fractional dot area) of each elemental area of the composite color print that will be occupied by cyan ink deposited therein during the printing process being simulated. For convenience in subsequent processing, in addition to the signal (c), signal inverter 26 in unit 18c also develops a second output signal (1-c) representative of the remaining portion of each elemental area of the com-posite color print that will not be occupied by cyan ink. If, for example, twenty percent of an elemental area of the cyan print is occupied by cyan ink [represented by the signal (c)], then eighty percent of that area will be unoccupied by cyan ink [represented by the signal (1-c)].

The remaining yellow, magenta, and black channels 13$y$, 13$m$ and 13$k$, respectively, of first analog processor 13 function in the same manner as that described above for the cyan channel to develop the pairs of output signals ($y$) and (1-$y$), ($m$) and (1-$m$), and finally ($k$) and (1-$k$), representing the fractional dot areas occupied in the actual composite color print by yellow, magenta and black inks, respectively. Thus, as elemental areas of a set of cyan, magenta, yellow and black color separation transparencies are simultaneously scanned by the electro-optical apparatus 10, 11 and 12, first analog processor 13 develops four pairs of output signals which represent the fractional portion of each corresponding elemental area of the composite color print that will be occupied by cyan, magenta, yellow and black inks, respectively, deposited on paper or other base material during the color printing process being simulated.

SECOND ANALOG PROCESSOR

Second analog processor 14 utilizes the four signal pairs supplied from the outputs of the preceding first analog processor 13, representing the fractional dot areas occupied in each corresponding elemental area of the composite color print by each of the four different colored printing inks, to derive solutions for the mathematical relationships established by Neugebauer, [Neugebauer, Ziets. f. TECH PHYSIK, 36, 22–89 (1937)], which relate these fractional dot areas to the apparent color exhibited by each corresponding elemental area of the composite color print in which inks have been deposited. In the present embodiment, the Neugebauer equations are solved in terms of the X, Y, Z tristimulus color representation system, which is particularly advantageous in that this system is well understood and permits easy conversion to any other color representation system. Also the X, Y, Z color components are unipolar in nature, making the conversion process to X, Y, Z representative signals from the color area representative signals appearing at the outputs of the exponential amplifiers 30$a$ – 30$i$ of FIG. 4 a particularly simple one that can be achieved with a resistor matrix alone, and does not require complex signal inversion arrangements as would be necessary in the case where the Neugebauer equations are solved in terms of other tristimulus components, such as R, G, B, which are bipolar in nature.

The Neugebauer equations for a four-color printing process and solved in terms of X, Y and Z are set forth hereinafter as Equations [10], [11] and [12] and can be considered to involve two successive multiplication steps. The first step involves multiplication of the fractional dot areas of those combinations of the four colored inks which can be deposited in any single elemental area of the final composite color print to produce visibly different colors. This results in a set of signals designated $A_c$, $A_m$, $A_y$, etc., representative of the fractional dot area occupied by each of the nine visibly different colors that it is possible to produce by means of a four-color printing process. These nine colors include the four basic ink colors (cyan, magenta, yellow, black), plus the three colors which arise from overlap of any two of the basic ink colors other than black, (red = magenta + yellow; blue = magenta + cyan; green = cyan + yellow), plus a color referred to as brown, or ALL, which arises from overlap of cyan, magenta and yellow inks, plus the base color of the paper being used in the printing process. (It is assumed here that the overlap of black ink and any of the other three inks will produce a color which is not visibly different from that observed when black ink alone is deposited.) These nine fractional dot areas are defined in accordance with the Neugebauer equations as follows:

cyan $A_c = (c)\,(1\text{-}m)\,(1\text{-}y)\,(1\text{-}k)$ 1.

magenta $A_m = (m)\,(1\text{-}c)\,(1\text{-}y)\,(1\text{-}k)$ 2.

yellow $A_y = (y)\,(1\text{-}m)\,(1\text{-}c)\,(1\text{-}k)$ 3.

red $A_r = (m)\,(y)\,(1\text{-}c)\,(1\text{-}k)$ 4.

blue $A_b = (c)\,(m)\,(1\text{-}y)\,(1\text{-}k)$ 5.

green $A_g = (c)\,(y)\,(1\text{-}m)\,(1\text{-}k)$ 6.

black $A_k = (k)\,(1\text{-}c)\,(1\text{-}m)\,(1\text{-}y)$ 7.

all $A_a = (c)\,(y)\,(m)\,(1\text{-}k)$ 8.

paper $A_p = (1\text{-}c)\,(1\text{-}m)\,(1\text{-}y)\,(1\text{-}k)$ 9.

Figure 4:
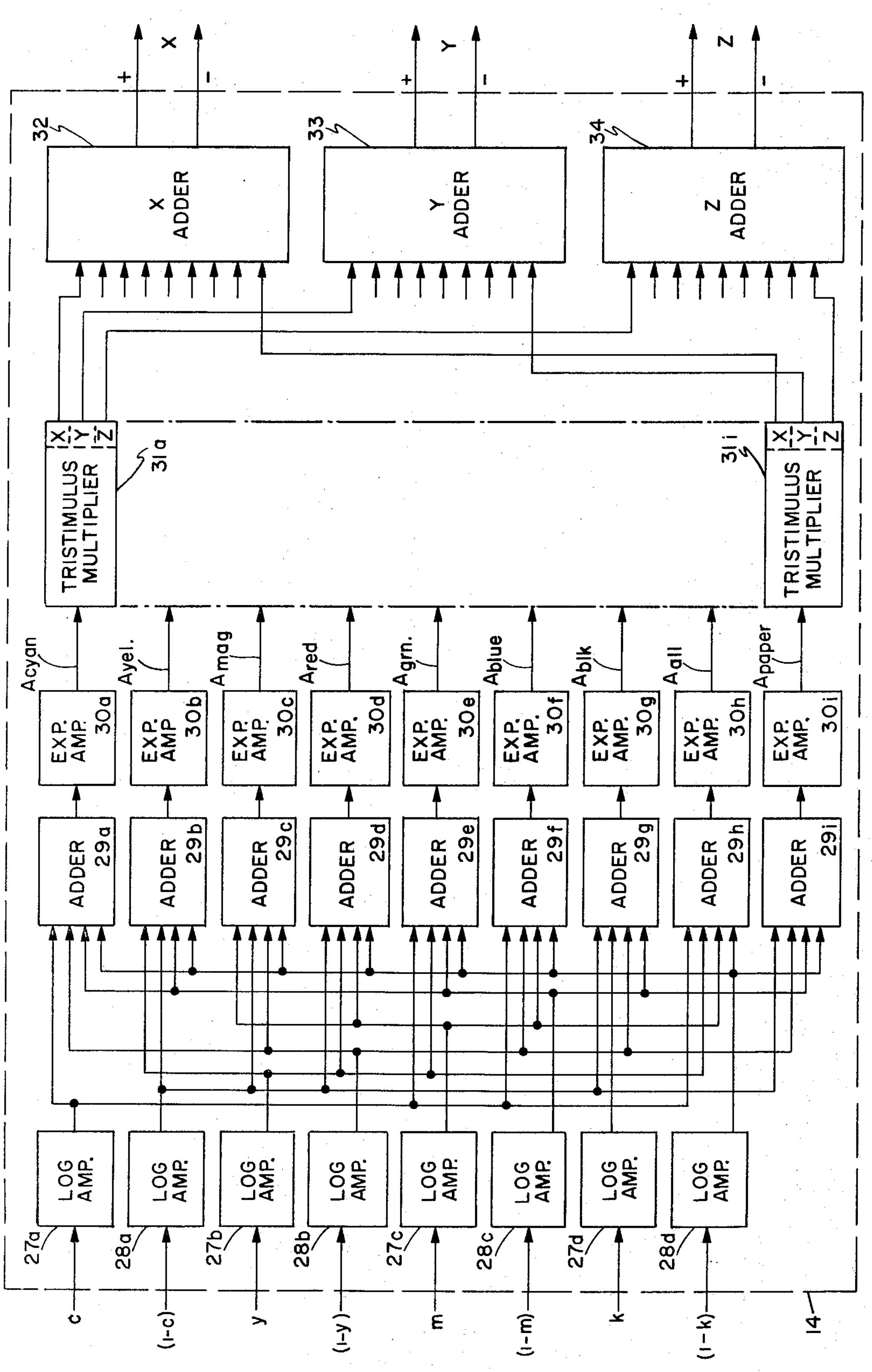
FIG. 4 is a detailed block diagram of a second analog processor useful in the apparatus of FIG. 1.

In FIG. 4 of the drawings there is shown one suitable embodiment of second analog processor 14, wherein this first multiplication step of the Neugebauer equations is performed by means of logarithms. In this embodiment advantage is taken of the fact that the product (A) (B) can be derived by taking the antilog of the simple sum [(log A) + (log B)]. In electrical terms, this can be achieved as shown in FIG. 4 by the series combination of logarithmic amplifiers, an adder, and an exponential amplifier such as the units 27*a*, 29*a* and 30*a*.

In the embodiment of FIG. 4 the eight ink fractional dot area representative signals from first analog processor 13 are logarithmically amplified in the four log amplifiers 27*a* – 27*d* (for the four primary signals) and the four log amplifiers 28*a* – 28*d* (for the four secondary or inverted signals). The resulting eight log signals are combined in accordance with Equations [1] – [9] above, in the nine adders 29*a* – 29*i*, and the output of each adder is exponentially amplified to derive the antilog and thus complete the multiplication process. The resulting nine signals ($A_c$, $A_m$, $A_y$, etc.) which appear at the outputs of respective ones of the exponential amplifiers 30*a* – 30*i* represent the fractional dot areas occupied by each of the nine possible visibly different colors in each elemental area of the composite color print being simulated.

The second multiplication step involved in the Neugebauer equations represents conversion of the aforementioned nine signals ($A_c$, $A_m$, $A_y$, etc.), which represent the fractional dot areas occupied by each of the nine different colors possible within an elemental area of the composite color print, into a set of tristimulus signals which represent the apparent color of that elemental area in the X, Y, Z color representation system. This step consists of defining the color of each of the nine different fractional dot areas in terms of the X, Y, Z tristimulus values of the specific ink - paper combination being simulated, and then summing all like tristimulus components. The resulting set of total X, Y, Z values define the apparent color of that elemental area of the composite color print. Thus, this second multiplication step involves, in fact, twenty-seven separate multiplications, defined in accordance with Neugebauer's equations for a four-color printing process solved in terms of X, Y, Z as follows:

$$X = A_c X_c + A_m X_m + A_y X_y + A_r X_{my} + A_b X_{cm} + A_g X_{cy} + A_k X_k + A_a X_{cym} + A_p X_p \quad 10$$

$$Y = A_c X_c + A_m Y_m + A_y Y_y + A_r Y_{my} + A_b Y_{cm} + A_g Y_{cy} + A_k Y_k + A_a Y_{cym} + A_p Y_p \quad 11$$

$$Z = A_c Z_c + A_m Z_m + A_y Z_y + A_r Z_{my} + A_b Z_{cm} + A_g Z_{cy} + A_k Z_k + A_a Z_{cym} + A_p Z_p \quad 12$$

In the above equations, the component X, Y and Z terms, such as $X_c$, $Y_c$ and $Z_c$, represent a set of unipolar tristimulus values which define the color characteristics of the specific ink-paper combination used in the printing process being simulated, and are empirically determined or are obtained from the ink or paper manufacturer. By inserting different values for $X_c$, $Y_c$ and $Z_c$, for example, any cyan ink-paper combination can be accommodated.

Figure 6:
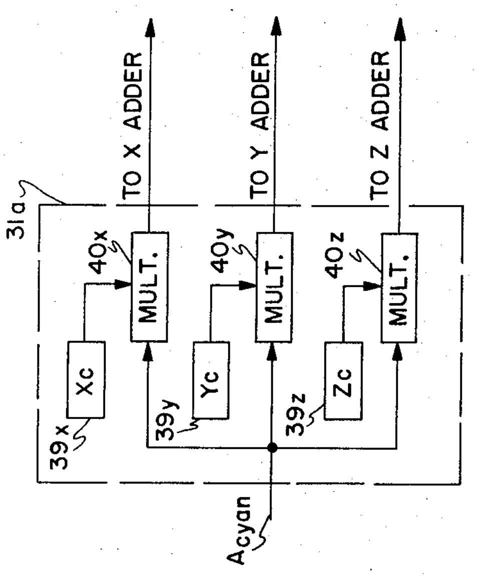
FIG. 6 is a detailed block diagram of a tristimulus multiplier useful in the second analog processor of FIG. 4.

In the embodiment of FIG. 4, this second multiplication step in the Neugebauer equations is performed in the series of multipliers 31*a* – 31*i*, one of which is shown in further detail in FIG. 6. The resulting product signals are appropriately summed in the X, Y, Z adders 32, 33 and 34, respectively. For convenience in subsequent processing, adders 32, 33 and 34 are shown as developing both (+) and (−) polarity output signals. This permits simple resistor matrixing to be employed in subsequent color conversions such as is necessary in the color image display apparatus 15*a* of FIG. 5.

Figure 7:
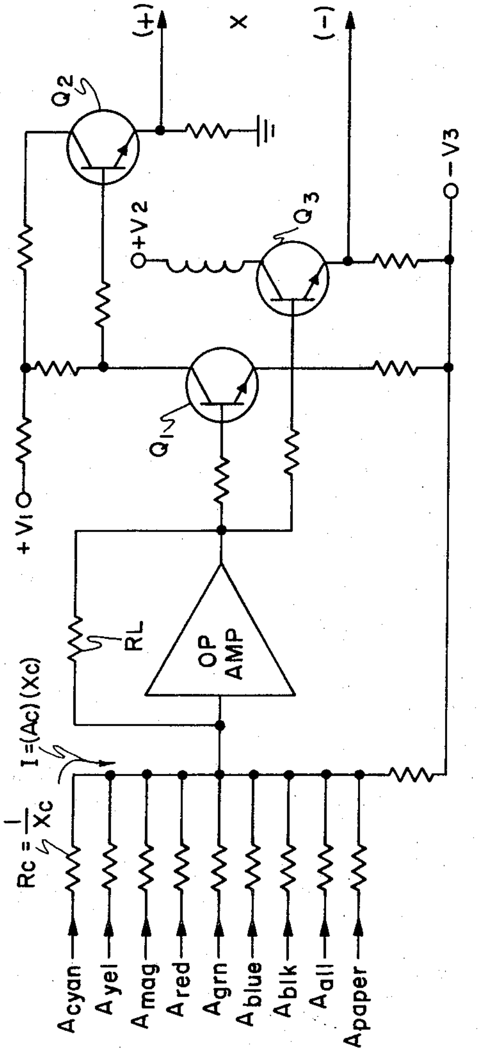
FIG. 7 is a detailed schematic diagram of a tristimulus multiplier useful in the second analog processor of FIG. 4.

A particularly simple circuit arrangement which can be utilized to perform the multiplication and summing function of units 31*a* – 31*i* and units 32 – 34, respectively in FIG. 4 is that shown in FIG. 7. The circuitry of FIG. 7 performs the nine multiplications and subsequent addition of products necessary to derive the desired (+) X and (−) X output signal pair. Multiplication of each of the nine fractional dot area representative signals $A_c$, $A_m$, $A_y$, etc. by the associated component X terms $X_c$, $X_m$, $X_y$, etc., is accomplished by utilizing a network of nine input resistors, each of whose resistance is chosen to be proportional to the reciprocal of a corresponding one of the component X terms, $X_c$, $X_m$, $X_y$, etc. For example in FIG. 7, the upper most resistor $R_c$ in the input network has a resistance which is proportional to $1/X_c$. As a result, when the appropriate fractional dot area representative signal $A_c$ is applied to the input of this resistor, it causes a current $I_c$ to flow therethrough, which current, in accordance with the well known relationship $I = V/R$, will be proportional to the product ($A_c$) ($X_c$). The operational amplifier (OP. AMP.) then sums the individual current from the input resistors through load resistor $R_L$. The resulting signal is amplified and inverted in the transistor pair $Q_1$ – $Q_2$ to provide the desired output signal (+) X, and is also amplified in the emitter follower transistor $Q_3$ to provide the desired output signal (−) X as shown in FIG. 7. Circuitry substantially identical to that of FIG. 7, except for input resistor values, may be used in a similar manner to develop the desired output signal pair (+) Y and (−) Y, and the pair (+) Z and (−) Z.

As mentioned previously, the group of X, Y, Z representative output signals from second processor 14 can be supplied to a variety of color image display units such as that of FIG. 5, for example. In the unit 15*a* of FIG. 5, the signal pairs (+) X, (+) Y and (+) Z are applied to a resistor matrix 35 where they are converted to a set of three signals, R, G, B, which represent the same color as was represented by the X, Y, Z signals, but do so in the R, G, B color representation system suitable for driving the conventional color picture tube 38. The resulting R, G, B signals are gamma corrected in the nonlinear amplifiers 36R, 36G, 36B to match the electrical signal to light output translation characteristics of the color CRT 38. The gamma corrected R, G, B signals are then applied to corresponding control electrodes of color CRT 38, through the drivers 37R, 37G, 37B, causing the color CRT to display a color image which simulates that which could be obtained from the input set of color separation transparencies by means of the specific graphic arts half-tone color printing process which the electronic proofing system of the invention has been adjusted to simulate. Upon viewing the color image that appears on the face of the color CRT 38, the operator can evaluate the quality of this simulated color print, and if the quality is undesirable in any respect, he can adjust the electrical operation of the proofing system by adjusting such units as the screening characteristic simulator 20 or the stroke adjustment simulator 24 and instantaneously evaluate, via the corresponding changes that occur in the displayed color image on tube 38, whether or not the actual printing process being simulated is capable of producing an acceptable color print from the existing set of input color separations. The operator can also evaluate the effects of changing to a different set of printing inks or using a different type of paper to print on by changing the component X, Y, Z values introduced in the tristimulus multipliers 31*a* – 31*i* of FIG. 4 and if necessary changing the characteristics of the ink spreading simulator 25 of FIG. 3. If the multiplication scheme of FIG. 7 is employed, the network of nine input resistors can be assembled as an easily replaceable unit which merely unplugs from the system. With this arrangement each different ink-paper combination can be simulated by a different plug-in network of resistors, so that the effects of printing with different ink-paper combinations can be readily evaluated by merely unplugging one network of resistors and plugging in a new network, which is representative of a different ink-paper combination.

From the above it will be appreciated that electronic color proofing systems constructed in accordance with the present invention are uniquely versatile, flexible and easy to operate in conjunction with the actual graphic arts color reproduction process which they simulate. Thus, not only can the system accommodate color separation transparency sets of different sizes without modification, but also the system operates by means of direct electrical analogs of the individual portions of the color reproduction being simulated, making adjustment of the actual reproduction process in accordance with the proofing results obtained by means of the present system a simple matter.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A graphic arts process simulation system capable of deriving from a set of continuous-tone or half-tone color separations, a group of output signals which collectively represent the apparent color of elemental areas of a composite color print that can be obtained from said set of separations by selected adjustment of the variable parameters of a graphic arts color reproduction process wherein color pigments are deposited on a base material, comprising:

electro-optical means for scanning the separations of said set to derive a corresponding set of image signals, each signal representing the image characteristics of successively scanned elemental areas of a corresponding one of said separations;

means, responsive to continuous-tone image signals from said electro-optical means and having an adjustable signal translation characteristic which is an electrical analog of the actual screening portion of said color reproduction process and which is adjustable to simulate adjustments which can be made in the variable parameters of said screening portion, for processing said continuous-tone image signals to develop a corresponding set of half-tone signals each representing a half-tone image which can be derived from a corresponding one of said continuous-tone separations by means of a selected adjustment of the variable parameters of said screening portion of said color reproduction process;

means, responsive to half-tone image signals from said electro-optical means and to half-tone signals from said continuous-tone image signal processing means and having an adjustable signal translation characteristic which is an electrical analog of the actual printing portion of said color reproduction process and which is adjustable to simulate adjustments which can be made in the variable parameters of said printing portion, for processing said half-tone signals and half-tone image signals to develop a corresponding set of area signals each representing the fractional portion of corresponding elemental areas of a composite color print that will be occupied by an associated color pigment deposited therein by means of a selected adjustment of the variable parameters of said printing portion of said color reproduction process;

and means, capable of being readily adjusted to simulate different base materials and different color pigments which can be used in said color reproduction process, for processing said area signals in accordance with a set of Neugebauer equations which define, in terms of a selected base material and a selected set of color pigments, the apparent color of each elemental area of said composite color print caused by the deposition of said color pigments therein by means of said color reproduction process, for developing a group of output signals which collectively represent the apparent color that will be exhibited by each of said elemental areas when said variable parameters of said reproduction process are so adjusted;

whereby said output signals may be utilized for displaying a composite color image which simulates the actual composite color print that can be obtained from said set of color separations by using a selected base material, a selected set of color pigments and a selected adjustment of the other variable parameters of said color reproduction process.

2. A system in accordance with claim 1 wherein said separations are transparencies which may contain continuous-tone or half-tone images and wherein said electro-optical means scans said transparencies to derive a corresponding set of image signals, each signal representing the light transmission characteristics of successively scanned elemental areas of a corresponding one of said separation transparencies.

3. A system in accordance with claim 1 which additionally includes a color image display means, responsive to said group of output signals, for displaying the composite color image which is represented by said output signals and which simulates the actual composite color print that can be obtained from said set of color separations by using a selected base material, a selected set of color pigments and a selected adjustment of the other variable parameters of said color reproduction process, whereby the effects on said color print of different adjustments in said variable parameters can be readily evaluated by viewing said displayed color image.

4. A system constructed in accordance with claim 1 wherein said means for processing area signals comprises:

means for multiplying together selected combinations of said area signals in accordance with Neugebauer equations for developing a set of intermediate signals each of which represents the fractional portion of corresponding elemental areas of said composite color print that will be occupied by a predetermined one of the colors that can be produced by means of said color reproduction process;

means for multiplying each of said intermediate signals by a set of component tristimulus values which represent in a chosen color representation system the color characteristics of the particular combination of said selected base material and said selected set of color pigments, for developing for each of said intermediate signals a corresponding set of tristimulus signals which define the color of the fractional area represented by each intermediate signal;

and means for combining like ones of said tristimulus signals for developing a group of output tristimulus signals which collectively represent in said chosen color representation system the apparent color that will be exhibited by each of the elemental areas of said composite color print when said variable parameters of the color reproduction process are so adjusted.

5. A system constructed in accordance with claim 4 wherein said chosen color representation system is the X, Y, Z system and wherein said means for processing area signals develops a group of X, Y, Z tristimulus value representative output signals which collectively represent the apparent color that will be exhibited by each of the elemental areas of said composite color print when said variable parameters of the color reproduction process are so adjusted.

6. A system constructed in accordance with claim 4 wherein said means for processing area signals develops a group of X, Y, Z tristimulus value representative output signals which collectively represent the apparent color that will be exhibited by each of the elemental areas of said composite color print when said variable parameters of the color reproduction process are so adjusted.

7. A graphic arts process simulation system capable of deriving from a set of continuous-tone or half-tone color separations, a group of output signals which collectively represent the apparent color of elemental areas of a composite color print that can be obtained from said set of separations by selected adjustment of the variable parameters of a graphic arts color reproduction process wherein color pigments are deposited on a base material, comprising:

electro-optical means for scanning the separations of said set to derive a corresponding set of image signals, each signal representing the image characteristics of successively scanned elemental areas of a corresponding one of said separations;

means responsive to continuous-tone image signals from said electro-optical means and having an adjustable signal translation characteristic which is an electrical analog of the actual screening portion of said color reproduction process and which is adjustable to simulate adjustments which can be made in the variable parameters of said screening portion, for processing said continuous-tone image signals to develop a corresponding set of half-tone signals each representing a half-tone image which can be derived from a corresponding one of said continuous tone separations by means of a selected adjustment of the variable parameters of said screening portion of said color reproduction process;

means responsive to half-tone image signals from said electro-optical means and to half-tone signals from siad continuous-tone image signal processing means and having an adjustable signal translation characteristic which is an electrical analog of the actual printing portion of said color reproduction process and which is adjustable to simulate adjustments which can be made in the variable parameters of said printing portion for processing said half-tone signals and half-tone image signals to develop a corresponding set of area signals each representing the fractional portion of corresponding elemental areas of a composite color print that will be occupied by an associated color pigment deposited therein by means of a selected adjustment of the variable parameters of said printing portion of said color reproduction process;

means for multiplying together selected combinations of said area signals in accordance with Neugebauer equations for developing a set of intermediate signals each of which represents the fractional portion of corresponding elemental areas of said composite color print that will be occupied by a predetermined one of the colors that can be produced by means of said color reproduction process;

means for multiplying each of said intermediate signals by a set of component tristimulus values which represent in a chosen color representation system the color characteristics of the particular combination of said selected base material and said selected set of color pigments, for developing for each of said intermediate signals a corresponding set of tristimulus signals which define the color of the fractional area represented by each intermediate signal;

means for combining like ones of said tristimulus signals for developing a group of output tristimulus signals which collectively represent in said chosen color representation system the apparent color that will be exhibited by each of the elemental areas of said composite color print when said variable parameters of the color reproduction process are so adjusted;

and a color image display means, responsive to said group of output signals, for displaying the composite color image which is represented by said output signals and which simulates the actual composite color print that can be obtained from said set of color separations by using a selected base material, a selected set of color pigments and a selected adjustment of the other variable parameters of said color reproduction process;

whereby the effects on said color print of different adjustments in said variable parameters can be readily evaluated by viewing said displayed color image.

8. A system constructed in accordance with claim 7 wherein said means for processing area signals develops a group of X, Y, Z tristimulus value representative output signals which collectively represent the apparent color that will be exhibited by each of the elemental areas of said composite color print when said variable parameters of the color reproduction process are so adjusted.

* * * * *